US009621605B2

(12) United States Patent
Dietrich et al.

(10) Patent No.: US 9,621,605 B2
(45) Date of Patent: Apr. 11, 2017

(54) METHODS AND APPARATUS FOR PROVIDING MEDIA FROM CONTENT PROVIDERS USING A NETWORK INTERFACE DEVICE

(75) Inventors: Bradley Dietrich, San Francisco, CA (US); Daniel Putterman, San Francisco, CA (US); Gregory Peters, Los Gatos, CA (US)

(73) Assignee: Rovi Solutions Corporation, San Carlos, CA (US)

( * ) Notice: Subject to any disclaimer, the term of this patent is extended or adjusted under 35 U.S.C. 154(b) by 717 days.

(21) Appl. No.: 11/595,737

(22) Filed: Nov. 10, 2006

(65) Prior Publication Data

US 2007/0283046 A1 Dec. 6, 2007

Related U.S. Application Data

(63) Continuation of application No. 11/444,564, filed on Jun. 1, 2006, now Pat. No. 7,929,551.

(51) Int. Cl.
*G06F 15/16* (2006.01)
*H04L 29/06* (2006.01)
(Continued)

(52) U.S. Cl.
CPC .... *H04L 65/4084* (2013.01); *G06F 17/30017* (2013.01); *H04L 67/06* (2013.01); *H04L 67/2823* (2013.01); *H04L 12/2812* (2013.01)

(58) Field of Classification Search
CPC .......... G06F 17/30017; H04L 12/2812; H04L 65/4084; H04L 67/06; H04L 67/2823
(Continued)

(56) References Cited

U.S. PATENT DOCUMENTS 5,506,932 A 4/1996 Holmes et al.
5,571,672 A 11/1996 Slavicek et al.
(Continued)

FOREIGN PATENT DOCUMENTS

CN 1744586 3/2006
EP 0 932 275 A2 7/1999
(Continued)

OTHER PUBLICATIONS

U.S. Appl. No. 09/332,244, filed Jun. 11, 1999, Ellis.
(Continued)

*Primary Examiner* — Khaled Kassim
*Assistant Examiner* — Zhaohui Yang
(74) *Attorney, Agent, or Firm* — Ropes & Gray LLP

(57) ABSTRACT

A network bridge connects a host device, such as digital media player, cell phone or camera, to content sources over a network to permit the host device to transmit or receive digital media. The network bridge includes a network interface module that identifies at least one media source as well as digital media available on the network. A host device interface module receives, from the host device, file system requests in accordance with a protocol, such as a mass storage protocol. In response to the request, a host device protocol interface module on the network bridge translates the file system request to a request for digital media. The network interface module acquires digital media from the media source, and the host device interface module transfers the digital media to the host device in accordance with the interface protocol.

21 Claims, 15 Drawing Sheets

(51) Int. Cl.
  G06F 17/30  (2006.01)
  H04L 29/08  (2006.01)
  H04L 12/28  (2006.01)

(58) Field of Classification Search
  USPC .................................. 709/230; 725/81, 87
  See application file for complete search history.

(56) References Cited

U.S. PATENT DOCUMENTS

| | | | |
|---|---|---|---|
| 5,751,672 A | 5/1998 | Yankowski | |
| 5,793,366 A | 8/1998 | Mano et al. | |
| 5,798,921 A | 8/1998 | Johnson et al. | |
| 5,815,297 A | 9/1998 | Ciciora | |
| 5,835,126 A | 11/1998 | Lewis | |
| 5,883,621 A | 3/1999 | Iwamura | |
| 5,930,473 A | 7/1999 | Teng et al. | |
| 5,945,988 A | 8/1999 | Williams et al. | |
| 5,969,283 A | 10/1999 | Looney | |
| 5,977,964 A | 11/1999 | Williams et al. | |
| 6,008,802 A | 12/1999 | Iki et al. | |
| 6,032,202 A | 2/2000 | Lea et al. | |
| 6,038,614 A | 3/2000 | Chan et al. | |
| 6,085,236 A | 7/2000 | Lea | |
| 6,111,677 A | 8/2000 | Shintani et al. | |
| 6,118,450 A | 9/2000 | Proehl | |
| 6,154,206 A | 11/2000 | Ludtke | |
| 6,160,796 A | 12/2000 | Zou | |
| 6,169,725 B1 | 1/2001 | Gibbs et al. | |
| 6,177,931 B1 | 1/2001 | Alexander et al. | |
| 6,182,094 B1 | 1/2001 | Humpleman et al. | |
| 6,208,341 B1 | 3/2001 | van Ee et al. | |
| 6,219,839 B1 | 4/2001 | Sampsell | |
| 6,232,539 B1 | 5/2001 | Looney et al. | |
| 6,236,395 B1 | 5/2001 | Sezan et al. | |
| 6,237,049 B1 | 5/2001 | Ludtke | |
| 6,243,725 B1 | 6/2001 | Hempleman | |
| 6,263,503 B1 | 7/2001 | Margulis | |
| 6,289,165 B1 | 9/2001 | Abecassis | |
| 6,353,700 B1 | 3/2002 | Zhou | |
| 6,356,971 B1 | 3/2002 | Katz | |
| 6,359,661 B1 | 3/2002 | Nickum | |
| 6,393,430 B1 | 5/2002 | Van Ryzin | |
| 6,456,714 B2 | 9/2002 | Shima et al. | |
| 6,466,080 B2 | 10/2002 | Kawai | |
| 6,487,145 B1 | 11/2002 | Berhan | |
| 6,577,735 B1 | 6/2003 | Bharat | |
| 6,647,417 B1 | 11/2003 | Hunter et al. | |
| 6,657,116 B1 | 12/2003 | Gunnerson | |
| 6,741,617 B2 | 5/2004 | Rosengren et al. | |
| 6,751,402 B1 | 6/2004 | Elliott et al. | |
| 6,816,175 B1 | 11/2004 | Hamp et al. | |
| 6,826,512 B2 | 11/2004 | Dara-Abrams et al. | |
| 6,839,769 B2 | 1/2005 | Needham | |
| 6,882,793 B1 | 4/2005 | Fu | |
| 6,901,603 B2 | 5/2005 | Zeidler | |
| 6,907,301 B2 | 6/2005 | Kou et al. | |
| 6,931,593 B1 | 8/2005 | Grooters | |
| 6,938,101 B2 | 8/2005 | Hayes et al. | |
| 7,039,643 B2 | 5/2006 | Sena et al. | |
| 7,058,635 B1 | 6/2006 | Shah-Nazaroff | |
| 7,231,175 B2 | 6/2007 | Ellis | |
| 7,240,356 B2 | 7/2007 | Iki | |
| 7,260,461 B2 | 8/2007 | Rao et al. | |
| 7,929,551 B2 * | 4/2011 | Dietrich ............ G06F 17/30017 370/395.5 | |
| 2001/0004338 A1 | 6/2001 | Yankowski | |
| 2001/0026287 A1 | 10/2001 | Watanabe | |
| 2001/0039660 A1 | 11/2001 | Vasilevsky | |
| 2001/0042107 A1 | 11/2001 | Palm | |
| 2001/0043700 A1 | 11/2001 | Shima et al. | |
| 2002/0010652 A1 | 1/2002 | Deguchi | |
| 2002/0046315 A1 | 4/2002 | Miller | |
| 2002/0059588 A1 | 5/2002 | Huber | |
| 2002/0059642 A1 | 5/2002 | Russ | |
| 2002/0069746 A1 | 6/2002 | Taira et al. | |
| 2002/0070982 A1 | 6/2002 | Hill | |
| 2002/0078161 A1 | 6/2002 | Cheng | |
| 2002/0078293 A1 | 6/2002 | Kou et al. | |
| 2002/0082901 A1 | 6/2002 | Dunning et al. | |
| 2002/0104091 A1 | 8/2002 | Prabhu et al. | |
| 2002/0113824 A1 | 8/2002 | Myers, Jr. | |
| 2002/0151992 A1 * | 10/2002 | Hoffberg et al. ............... 700/83 |
| 2002/0166123 A1 | 11/2002 | Schrader | |
| 2002/0174444 A1 | 11/2002 | Gratto | |
| 2002/0178211 A1 * | 11/2002 | Singhal et al. ............... 709/201 |
| 2002/0180803 A1 | 12/2002 | Kaplan | |
| 2002/0188735 A1 | 12/2002 | Needham | |
| 2002/0194260 A1 | 12/2002 | Headley | |
| 2003/0035404 A1 | 2/2003 | Ozluturk | |
| 2003/0046437 A1 | 3/2003 | Eytchison et al. | |
| 2003/0068154 A1 | 4/2003 | Zylka | |
| 2003/0110272 A1 | 6/2003 | Du Castel | |
| 2003/0135860 A1 | 7/2003 | Dureau | |
| 2003/0149988 A1 * | 8/2003 | Ellis et al. ...................... 725/87 |
| 2003/0214955 A1 | 11/2003 | Kim | |
| 2003/0220091 A1 | 11/2003 | Farrand | |
| 2004/0117831 A1 | 6/2004 | Ellis | |
| 2004/0117851 A1 * | 6/2004 | Karaoguz .............. H04N 7/163 725/134 |
| 2004/0184763 A1 | 9/2004 | DiFrancesco | |
| 2004/0224638 A1 | 11/2004 | Fadell et al. | |
| 2004/0255326 A1 * | 12/2004 | Hicks et al. .................... 725/81 |
| 2005/0028208 A1 | 2/2005 | Ellis | |
| 2005/0039208 A1 | 2/2005 | Veeck | |
| 2005/0227611 A1 | 10/2005 | Ellis | |
| 2005/0246393 A1 | 11/2005 | Coates | |
| 2006/0004685 A1 | 1/2006 | Haggman | |
| 2006/0080707 A1 | 4/2006 | Laksono | |
| 2006/0259949 A1 | 11/2006 | Schaefer | |
| 2007/0162661 A1 | 7/2007 | Fu et al. | |
| 2007/0283046 A1 * | 12/2007 | Dietrich et al. ............... 709/245 |
| 2009/0025048 A1 * | 1/2009 | Ganesan ......................... 725/92 |

FOREIGN PATENT DOCUMENTS

| | | |
|---|---|---|
| EP | 1217787 A2 | 6/2002 |
| EP | 1427148 | 11/2003 |
| JP | 2003-162444 A | 6/2003 |
| JP | 2003-209893 A | 7/2003 |
| JP | 2003-526291 | 9/2003 |
| JP | 2003-527645 | 9/2003 |
| JP | 2005-341315 | 12/2005 |
| JP | H11-341040 | 12/2009 |
| WO | WO 99/14945 A1 | 3/1999 |
| WO | WO99/14945 A1 | 3/1999 |
| WO | WO99/35753 A3 | 7/1999 |
| WO | WO 99/35753 A3 | 7/1999 |
| WO | WO 99/64969 A2 | 12/1999 |
| WO | WO99/64969 A2 | 12/1999 |
| WO | WO00/17738 A1 | 3/2000 |
| WO | WO 00/17738 A1 | 3/2000 |
| WO | WO 00/59230 A1 | 10/2000 |
| WO | WO00/59230 A1 | 10/2000 |

OTHER PUBLICATIONS

U.S. Appl. No. 09/330,860, filed Jun. 11, 1999, Ellis.
U.S. Appl. No. 09/354,344, filed Jul. 16, 1999, Ellis.
Dimitrova, et al. "Personalizing Video Recorders Using Multimedia Processing and Integration." ACM 2001.
Haas et al., Proccedings of ICIP 2002 "Personalized News Through Content Augmentation and Profiling", Rochester, NY, Sep. 2002.
U.S. Appl. No. 09/910,316, filed Jul. 19, 2001, Putterman.
U.S. Appl. No. 10/099,064, filed Mar. 14, 2002, Putterman.
U.S. Appl. No. 10/949,775, filed Sep. 23, 2004, Putterman.
U.S. Appl. No. 11/318,793, filed Dec. 27, 2005, Dietrich.
U.S. Appl. No. 10/288,505, filed Nov. 1, 2002, Putterman.
U.S. Appl. No. 11/444,564, filed Jun. 1, 2006, Dietrich.
International Search Report of the International Searching Authority for related foreign application PCT/US2006/049398.
Foreign Office Action for related JP Patent Application 2004-550446.

(56) References Cited

OTHER PUBLICATIONS

Foreign Office Action for related EP Patent Application 06848226.4.
Written Opinion of the International Searching Authority for related foreign application PCT/US2007/070157.

* cited by examiner

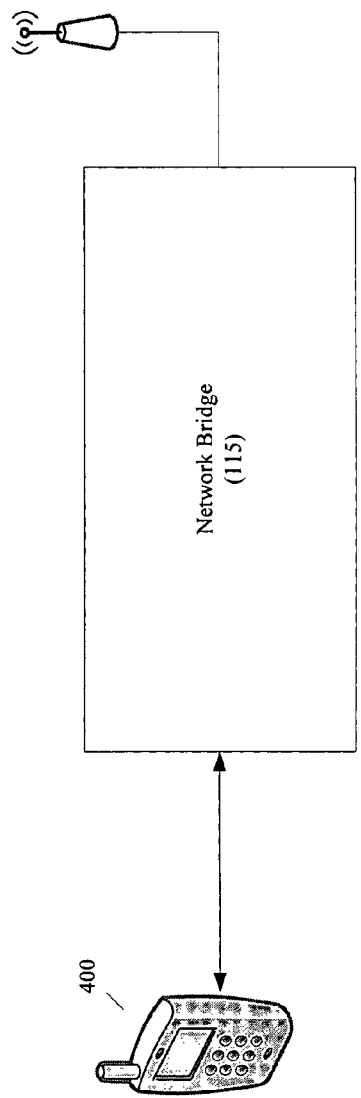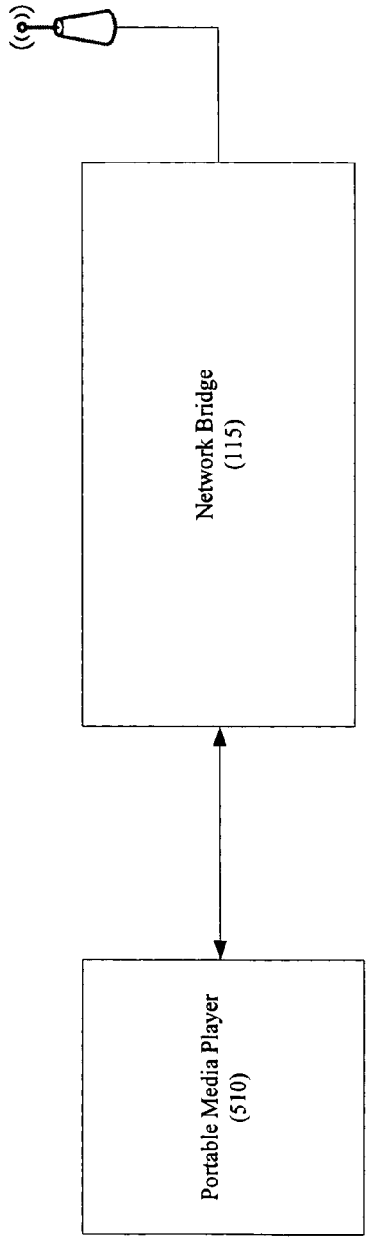

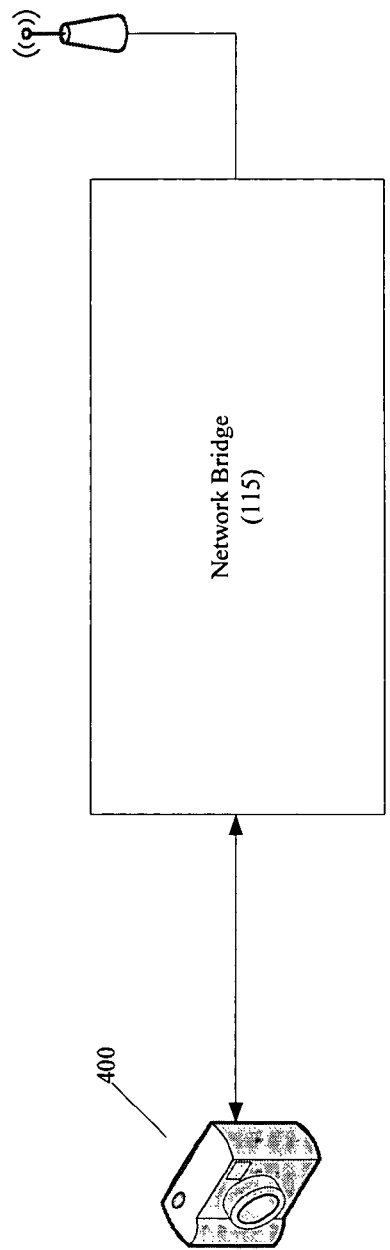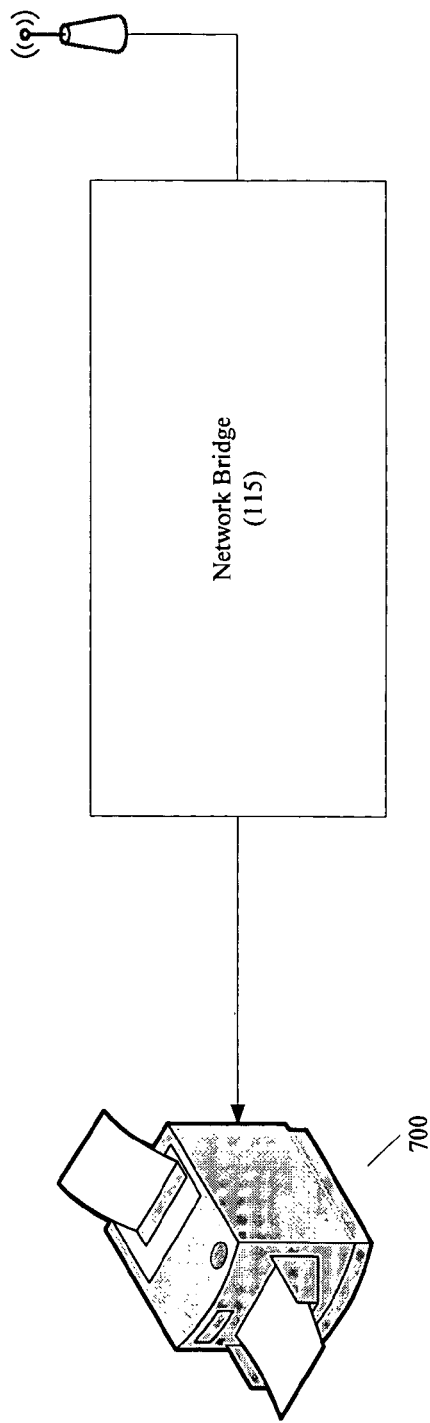
FIG. 6
FIG. 7

METHODS AND APPARATUS FOR PROVIDING MEDIA FROM CONTENT PROVIDERS USING A NETWORK INTERFACE DEVICE

CROSS-REFERENCES TO RELATED APPLICATIONS

This application is a continuation of and claims the benefit of U.S. patent application Ser. No. 11/444,564, filed Jun. 1, 2006 now U.S. Pat. No. 7,929,551, entitled "Methods And Apparatus For Transferring Media Across A Network Using A Network Interface Device."

BACKGROUND OF THE INVENTION

Field of the Invention:

The present invention is directed toward the field of networking consumer electronic devices, and more particularly directed toward a network interface device for transferring media across a network.

Art Background:

The widespread use of computers, digital cameras, digital music and video players, and the Internet has resulted in the creation and use of digital media. Digital media has also largely replaced more traditional analog audio and video formats with the introduction and popular acceptance of audio compact discs (CDs) and digital video discs (DVDs). In general, digital media consists of various formats of data that stores audio, video, and images in binary formats. These binary files are typically stored on a medium accessible to computer devices, such as CD-ROMs, hard drives, floppy disks and memory sticks.

The storage of digital media on commonly used computer medium allows for easy generation and transfer of digital media. For example, it has become popular to generate digital photos using a digital camera and then to transfer the digital photos onto computers. Computer software permits the user to manipulate the digital photos. The user may then transfer the digital photos to friends using e-mail, or post the digital photos on a web site accessible on the World Wide Web. These types of applications, which take advantage of connectivity among different devices, have also contributed to the widespread popularity of digital media.

Portable media rendering devices have also become very popular along with the widespread popularity of digital media. These portable media devices, when first introduced, were capable of playing digital audio. Today, some portable media devices also play video. Technological advances in mass storage allow these portable media devices to store relatively large amounts of digital media. However, a user must copy the digital media onto the storage device of the portable media player. Although the use of computers, and their connection to networks, may facilitate the transfer of the media onto the portable devices, it is desirable to develop devices and techniques to transfer media between portable media devices and other devices to increase the functionality of portable devices.

SUMMARY OF THE INVENTION

A media system includes a media service to provide at least one media item to a portable network bridge. The portable network bridge receives a file system request from a host device in accordance with a mass storage protocol. The portable network bridge translates the file system request to a media request for at least one media item, and transfers the media request to the media service. The media service generates a response to the media request for the portable network bridge for media items available from one or more content providers.

In on embodiment, the file system request includes a request to view a list of media items available from the media service. The portable network bridge generates a content directory that organizes the media available from the media service, and presents the content directory to the host device in accordance with the mass storage protocol. In one embodiment, the content directory contains an aggregated list of media available from a plurality of content providers. The content directory view may be customized for individual users.

In another embodiment, the file system request includes a request to transfer media from at least one content provider to the portable network bridge. For this embodiment, the media service receives the file system request, and establishes a connection between the content provider and the portable network bridge. After receiving the media, the portable network bridge transfers the media to the host device.

In another embodiment, a portable network bridge couples a host device directly to one or more content providers.

BRIEF DESCRIPTION OF THE DRAWINGS

FIG. 4 illustrates one embodiment for using a cell phone in conjunction with a network bridge.

FIG. 5 is a block diagram illustrating one embodiment for a portable media player and a network bridge.

FIG. 6 illustrates one embodiment for interfacing a digital camera to the network bridge of the present invention.

FIG. 7 illustrates one embodiment for interfacing a printer to the network bridge of the present invention.

DETAILED DESCRIPTION

Figure 1:
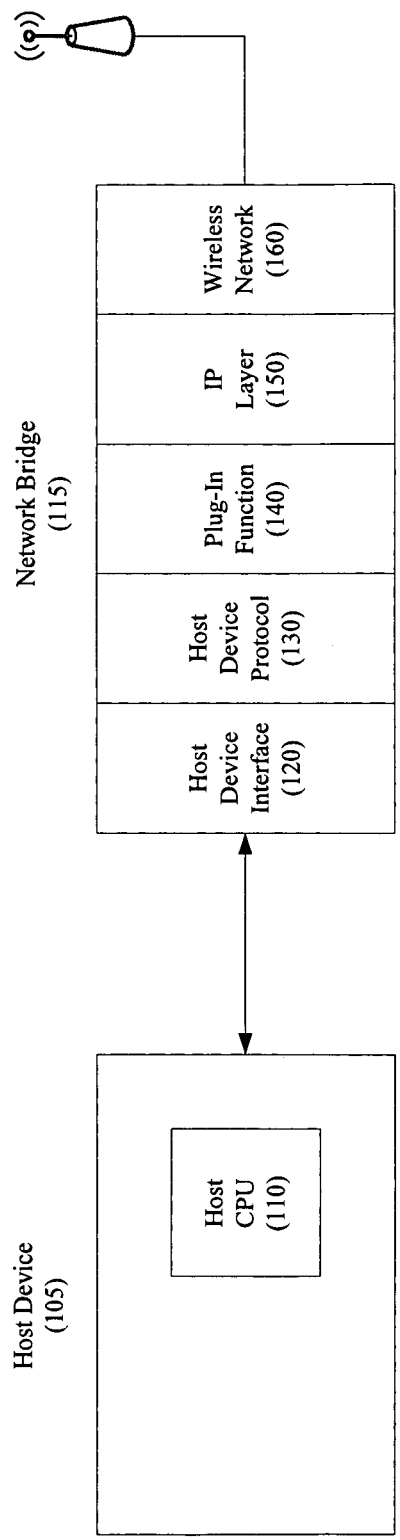
FIG. 1 is a block diagram illustrating one embodiment of a host device and a network bridge.

A device to interface a media device to a network, herein referred to as a network bridge, provides a means for a device to upload and download digital media from one or more networks. FIG. 1 is a block diagram illustrating one embodiment of a host device and a network bridge. In general, network bridge 115 provides a host device 105 access to a wireless network. As shown by the bi-directional arrows in FIG. 1, host device 105 may consume media (perform read operations of digital media from network bridge) and/or may source media or data (perform write operations to network bridge).

In general, the network bridge 115 connects host device 105 to a wireless network. As such, the network bridge 115 contains modules to interface host device 105 to a wireless network. Specifically, for this embodiment, network bridge 115 includes Internet protocol (IP) layer 150 and wireless network interface 160. In general, IP layer 150 formats and packets data for transport via the TCP/IP protocol, and wireless network module 160 provides a physical layer implementation to modulate data for transmission on a wireless network. The wireless network may comprise any type of wireless network, including a WiFi wireless network configured in accordance with IEEE 802.11a, IEEE 802.11b, IEEE 802.11g, IEEE 802.11(n) (proposed) or Bluetooth.

In one embodiment, host device 105 includes processing resources, such as a central processing unit (CPU) 110. The host device 105 may comprise any type of device generally used to playback, store or transmit media. Examples of host devices are described more fully below.

In general, network bridge 115 includes a means to communicate to host device 105. To perform this task, network bridge 115 contains host device interface 120 and host device protocol (130). The host device interface 120 implements a physical layer interface to transfer electrical signals between the host device 110 and the network bridge 115. For example, the host device interface may comprise a wireless or infrared interface or a hard wired interface, such as the universal serial bus (USB) interface or SDIO. Host device interface 120 may support any standard physical layer interface, and in fact, host device interface 120 is intended to represent a broad category of physical layer interfaces used to transmit data between devices.

The network bridge 115 also includes a host device protocol 130. The host device protocol 130 implements or emulates a logical layer protocol to support data transfer operations between host device 105 and the network bridge 115. Embodiments for implementing a host device protocol are described more fully below.

In one embodiment, the network bridge of the present invention provides functionality to the host device. For the embodiment shown in FIG. 1, network bridge 115 includes plug-in function 140. In general, plug-in function 140 supports additional functionality not provided by or generally associated with a typical network interface device (i.e., the host interface requires host processor 110 to implement these features). As described more fully below, plug-in function 140 may generate a content directory to identify digital media as well as locations of media content available to host device 105. Plug-in function 130 may, however, include any type of function to increase the utility of the host device 105.

Figure 2:
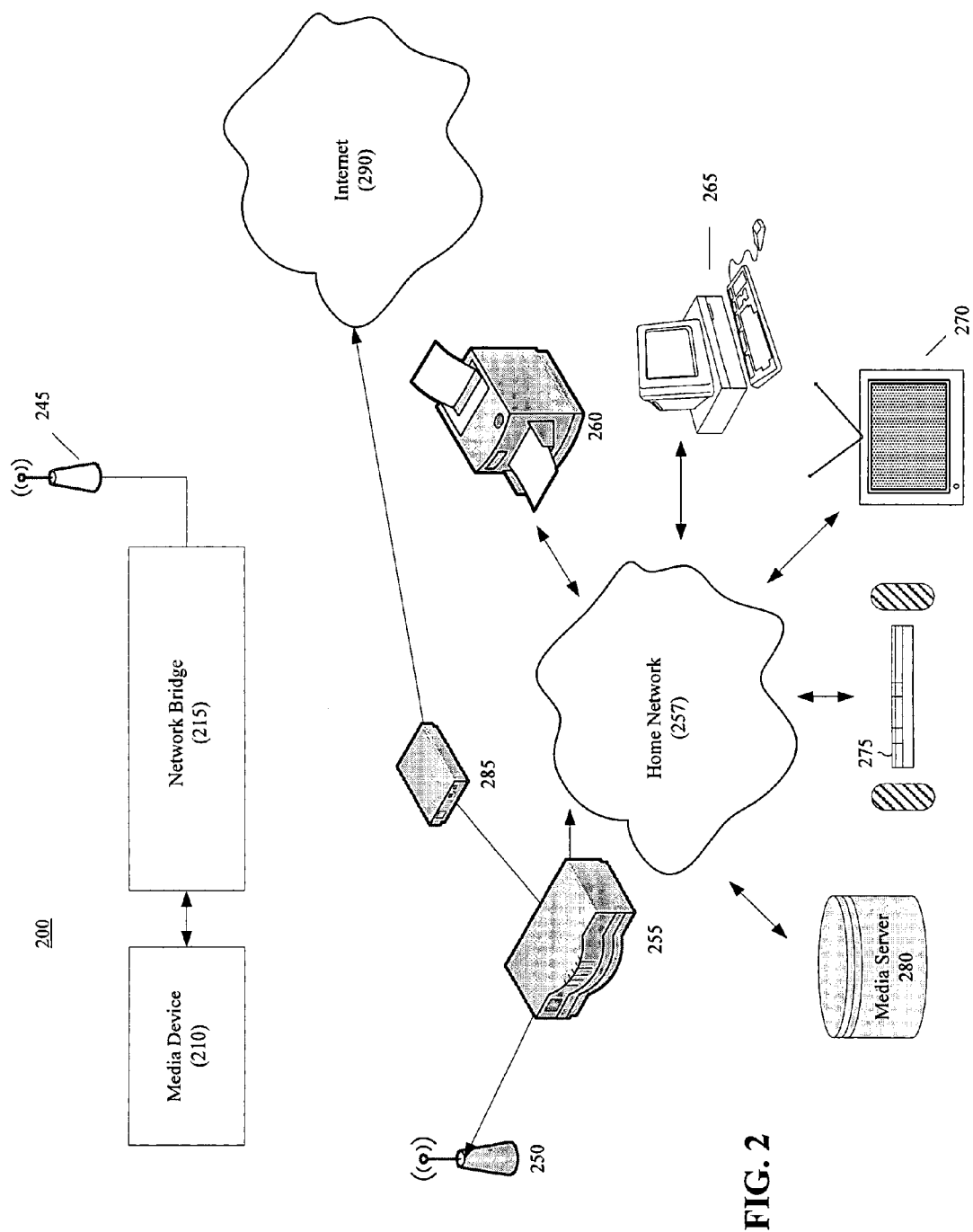
FIG. 2 illustrates one embodiment for integrating a media device with other media devices in a networked environment.

The network bridge of the present invention may be used to integrate a media device with other devices in a networked media environment. The network bridge may integrate media devices over a local area network (LAN) or integrate media devices over a wide area network (WAN), such as the Internet. FIG. 2 illustrates one embodiment for integrating a media device with other media devices in a networked environment. As shown in FIG. 2, media device 210 uses network bridge 215 to integrate the media device with other available media devices. For this example, a router 255 is coupled to a wireless network through wireless access point 250. Network bridge 215 implements a wireless network interface through wireless antenna 245. Home network 257 may comprise a wireless network or may comprise a wired network. For example, home network 257 may comprise networks implemented in accordance with standards, such as Ethernet 10/100 on Category 5, HPNA, Home Plug, IEEE 802.11x, IEEE 1394, and USB 1.1/2.0.

Home network 257 connects one or more devices. For this example, home network 257 integrates a printer 260, a computer 265, a television 270, a stereo 275 and a media server 280. As used herein, a media server is a device capable of delivering media to the home network. For example, a media server may comprise a mass storage device for storing digital media. In other embodiments, a media server may comprise a device that accesses media from other devices, including media contained on different networks. The components shown on home network 257 are merely exemplary; and the home network, as referenced herein, may integrate any number or type of devices, requiring data or media services, without deviating of the spirit or scope of the invention.

Using the network bridge 215, media device 210 receives media from and transmits media to devices on home network 257. For example, media device 210 may retrieve digital media from media server 280 or computer 265. For this example, media device 210 may playback video streamed from media server 280. In another example, media device 210 may copy or stream digital media to a media device on home network 257. For example, device 210 may stream digital audio through network bridge 215 for playback at stereo 275. In another example, media device 210 may stream video, stored at media device 210, through network bridge 215 to television 270 over home network 257.

In other embodiments, media device 210 may transfer data to another device on the home network 257. In some of these embodiments, network bridge 215 is configured to implement a protocol suitable for data communications between media device 215 and a source device on home network 257. For example, a user may desire to print a file, stored on media device 210, on printer 260. For this embodiment, network bridge 215 emulates a protocol to print data from media device 210 to printer 260 over home network 257.

As shown in FIG. 2, home network 257 is also coupled to a wide area network 290, such as the Internet, through broadband modem 285. The modem 285 integrates the wide area network to the local network (e.g., home network 257) through router 255. Modem 285 may utilize any type of technology to acquire a connection to the wide area network (e.g., dial-up modem, cable modem, digital subscription line (DSL), satellite modem, etc.). For these embodiments, media device 215 may retrieve and send data, such as digital media, over the wide area network 290. For example, media device 215, through network bridge 215, may download streaming audio/video from a content-based web site. Similarly, media device 210, may upload digital media, such as digital photos, to an Internet repository through the network bridge 215. Although the system 200 shown in FIG. 2 includes both a home network and a wide area network, media device 210 and network bridge 215 may be configured to operate over a wide area network only or over a home network only.

Figure 3:
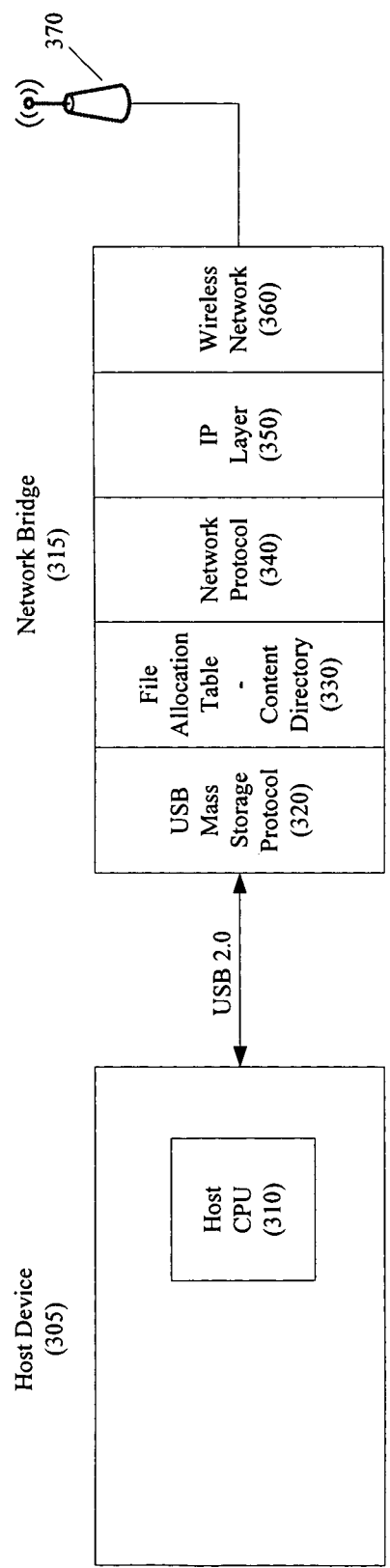
FIG. 3 is a block diagram illustrating one embodiment for implementing a mass storage protocol in a network bridge.

The network bridge of the present invention may be configured to implement popular communications standards. In one embodiment, a network bridge 315 implements a mass storage protocol standard. In general, the mass storage protocol standard is used to store files in a file system format. FIG. 3 is a block diagram illustrating one embodiment for implementing a mass storage protocol in a network bridge. For this embodiment, a host device 305 implements, as either a client device or a host device, the mass storage protocol standard using host CPU 310. In general, the mass storage protocol defines a standard for devices to read and write files to external storage devices. For this embodiment, the network bridge 315 operates, with regard to the host device 305, as a mass storage device. As such, the host device 310 reads and writes files to the network bridge 315 in the same manner as the host device 310 reads and writes files to a standard direct attached mass storage device. The network bridge 315, operating as a mass storage device, translates file system requests to transmit and receive data (e.g., digital media) over the wireless network 370.

For the embodiment shown in FIG. 3, network bridge 315 includes a physical layer implementation. For example, the physical layer implementation may be the Universal Serial Bus (USB) 2.0 protocol. For this physical interface, a user of host device 305 plugs a USB connector either into the host device 305 or into the network bridge 315. Although the embodiment of FIG. 3 shows a USB connection between host device 305 and the network bridge, any type of connection, including a wireless connection, may be used without deviating from the spirit or scope of the invention.

The network bridge 315 includes a USB mass storage protocol module 320. The mass storage protocol module 320 implements the USB mass storage protocol for the network bridge 315. Protocol implementations compatible with the USB mass storage protocol are well-known, and therefore are not described in further detail. In order to associate file names with physical locations on the media, the USB mass storage protocol utilizes a file system, such as Microsoft's file allocation table (FAT). In general, a file system identifies a physical location for storage of the file that corresponds to a name for the file in the directory structure. Most host devices implement FAT to utilize file storage in a generic mass storage device in this manner. The network bridge of the present invention maps file names to storage locations in its' emulated mass storage blocks.

For the network bridge embodiment, the network bridge maps the file allocation table to a content directory of remote items. To accomplish this, file allocation table—content directory 330 translates file system requests by mapping those requests to a content directory. In one embodiment, the network bridge 315 builds the content directory on-the-fly. As is described more fully below, the content directory is based on content available over the network (e.g., either local home network or wide area network). As a result of this translation, the host device 305 executes file system operations to the network bridge, and in response to those requests, returns content directories, as directory information, and digital media (e.g., digital audio, video or photos) as files within the file system.

As shown in FIG. 3, network bridge 315 also includes network protocol module 340, IP layer 350, and wireless network interface 360. The network protocol 340, IP layer 350 and wireless network interface 360 or those modules typically found in a wireless network adapter; and as such, are intended to represent a broad category of portable wireless network adapters.

Enabling Portable Media Devices:

The device, used in conjunction with the network bridge of the present invention, may comprise a cellular telephone (cell phone). FIG. 4 illustrates one embodiment for using a cell phone in conjunction with a network bridge. Today, many cell phones are configured to also operate as portable media devices. For example, many cell phones include cameras to acquire digital images and video. Some cell phones also include digital music players to play digital music files. These cell phones may also have screens and output jacks to play music and display photos and video. Cell phone 400 may receive, through network bridge 115, digital audio/video and digital photos. Cell phone 400 may also transmit digital audio/video and digital photos to other devices on the network. For example, cell phone 400 may upload digital photos to a television on the network or a web site.

Some cell phones operate also as personal digital assistants (PDAs). These cell phones typically include contacts, calendar and task applications. Typically, personal digital assistants are used in conjunction with a computer system that also maintains contacts, calendar of events, and tasks. In one embodiment, cell phone 400 may also be configured to synchronize data from another computer device. For this embodiment, network bridge 115 is configured to translate file system requests, compatible with a mass storage protocol, to a format compatible with the underlying contact calendar and task applications.

The media device, used in conjunction with the network bridge, may comprise any type of device capable of playing and/or providing digital media to the system. In one embodiment, the device comprises a portable media player. FIG. 5 is a block diagram illustrating one embodiment for a portable media player and a network bridge. As shown in FIG. 5, portable media player 510 is coupled to a wireless network bridge 115. Communications between the portable media player 515 and the network bridge 115 may be bi-directional, such that the portable media player may receives digital media as well as transmit digital media between network bridge 115 and portable media player 510. In other embodiments, communications between the portable media player 515 and the network bridge 115 may be unidirectional, such that the PMP only receives or transmits digital media.

In one embodiment, the portable media player 510 may comprise a portable digital audio player. For this embodiment, the portable digital audio player contains non-volatile memory for storing digital music files. The digital music files may be formatted in any number of formats, such as MPEG Audio Layer 3 ("MP3"). In another embodiment, the portable media player 510 may comprise a portable device capable of playing videos and/or displaying photos. For this embodiment, the portable media player 510 receives digital video files and digital photos over the network, through network bridge 150, and processes the digital video and digital photo files for display on its display. The digital video files may comprise full-length video productions or video clips, formatted in any number of well-known formats for digital video, such as MPEG 4. Digital photos may be formatted in any number of well-known formats for digital photos, such as JPEG.

The portable media player 510 may also be used as a media server. For these embodiments, digital audio, video and photos, stored on non-volatile memory in the portable media player 510, may be uploaded through network bridge 115 to the network to a destination device on the network (i.e., destination device located on the home network or on the wide area network).

In other embodiments, the device used in conjunction with the network bridge of the present invention may comprise a digital camera. FIG. 6 illustrates one embodiment for interfacing a digital camera to the network bridge of the present invention. For this embodiment, digital camera 600 sends and receives data over the network through network bridge 115. In one embodiment, the data comprises digital photos. A user may take several digital photos, using digital camera 600, and desire to transfer over a network the digital photos to one or more destination devices. The user may connect digital camera 600 to network bridge 115, through one of the wired or wireless interfaces described herein, to transmit digital photos to one or more destination devices on the network (e.g., home network or wide area network). For this example, the user may attach the network bridge 115 to digital camera 600. The digital camera 600 "sees" the network bridge 115 as a storage device, and sees the remote content directory generated by the network bridge. The network bridge 115 presents the devices, available over the network, as directory information to the digital camera 600. In addition, the user may desire to upload digital photos to an Internet web site. For this example, the user transmits the digital photos files to a destination virtual content directory presented by the network bridge, and in turn, the network bridge uploads the digital photo files to the Internet.

In addition to uploading and downloading digital media, a device may be configured to receive or transmit data in accordance with a protocol. For example, network bridge 115 may be configured to support protocols for printing. FIG. 7 illustrates one embodiment for interfacing a printer to the network bridge of the present invention. For this embodiment, network bridge 115 is configured to translate protocols for printing. Specifically, network bridge 115 receives data from a device on the network (computer, portable media player, cell phone, camera, etc.). In turn, network bridge 115 translates the data received into data compatible with a protocol used for the print operation.

Figure 8:
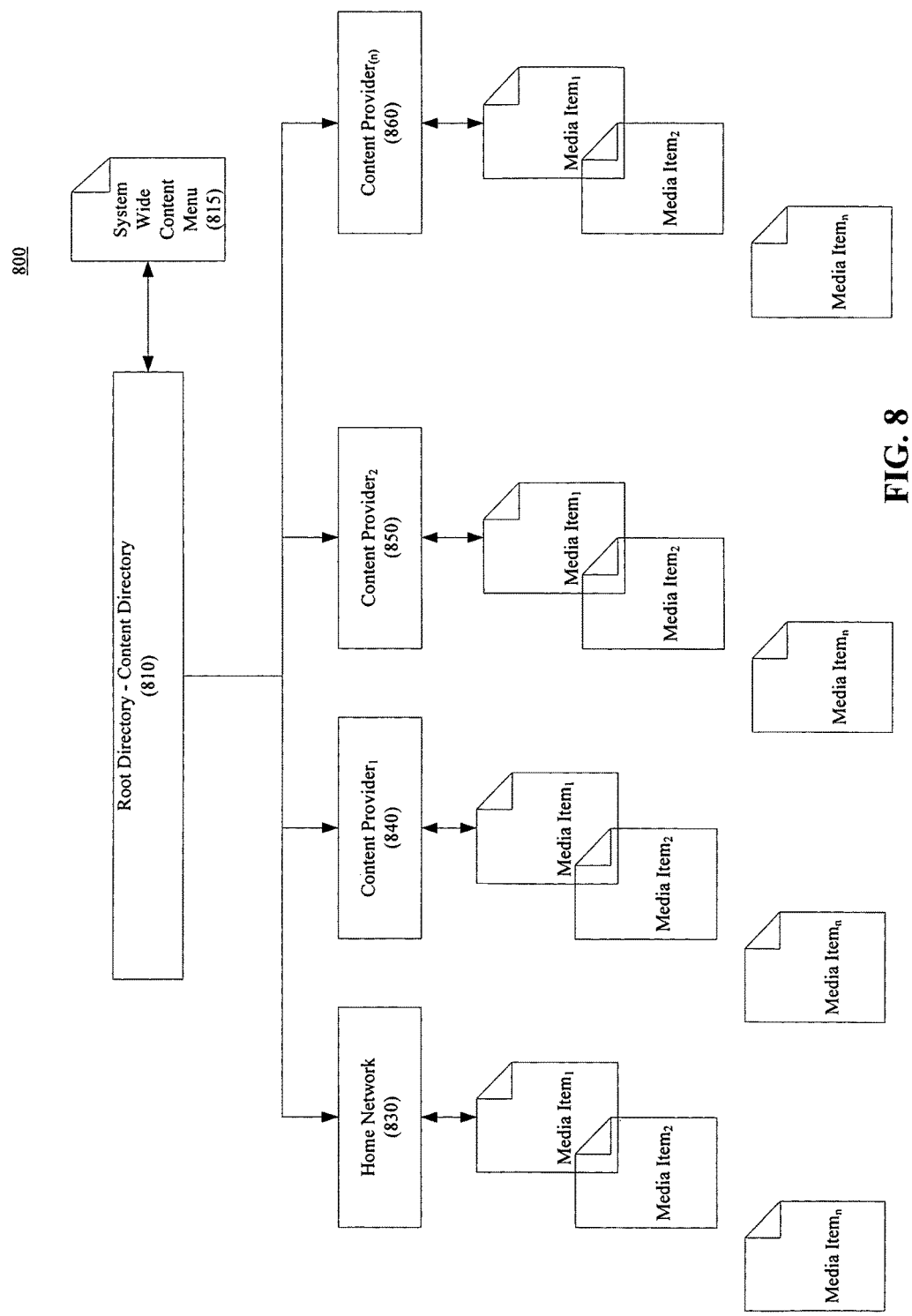
FIG. 8 is a block diagram illustrating an example content directory.

Content Directory Mapping:

A "content directory" provides information regarding media available over one or more networks. In some embodiments, the network bridge maps a content directory, defined by the mass storage protocol, to a file system. Specifically, the network bridge maps content directories to file system directories, and maps digital media (e.g., streaming audio or video) to files defined by the file system. FIG. 8 is a block diagram illustrating an example content directory. A root directory—content directory 810, located at the top of the hierarchical tree, represents the base or root directory in the mass storage file system. The root directory of the mass storage file system is mapped to content directory 810. In one embodiment that couples the network bridge to a home network, the content directory may comprise the root directory to a home network configured in accordance with the Universal Plug and Play ("UPnP") A/V standard.

For the example embodiment illustrated in FIG. 8, the root directory—content directory 810 is associated with a system wide content menu 815. In general, the system wide content menu 815 comprises a user interface menu for selecting content. The user interface menu is rendered on the media device. In one embodiment, the system wide content menu 815 is generated on-the-fly so as to customize a user interface menu based on available digital media. The system wide content menu 815 may be organized based on content or location of the media. For example, the system wide content menu 815 may include menu items for "music", "video" and "photos." These menu items may correspond to directories, located beneath the root directory. In another embodiment, the content menu may include menu items, listed by content provider, that may correspond to directories in the content directory. A content menu may have multiple menu types, selectable by user preference or predefined by some other variable, such as the type of device connected.

To acquire media, a user connects the media device to the network bridge. In response, the media device mounts the network bridge, which appears as a mass storage device. For example, an icon, representing the network bridge, may appear on the media device display. A user may then "explore" the mounted mass storage device for content. For example, the user may click on the icon to view the root directory of the network bridge. In response to this user action, the device generates a file system request to view the root directory of the mass storage device (i.e., network bridge). In response to the root directory request, the network bridge transmits, as directory information, the system wide content menu 815, and the media device renders the system wide content menu on the display of the media device.

For the example of FIG. 8, a number of directories, identifying content sources, are located beneath the root directory—content directory (810). Specifically, for the example hierarchy shown in FIG. 8, directories for content sources include home network 830 and several content providers (e.g., content provider$_1$ (840), content provider$_2$ (850), and content provider$_n$ (860)). Each content source is mapped to a directory of the file system. For this configuration, a user may view the content source directories to select media available from those sources. For example, the system wide content menu may include a menu item for "music." A user, after selecting the menu item (i.e., directory) for music, may receive directory information identifying all of the content sources that contain music. For example, in response to the selection of the music directory, the user may view directory information for "home network", "content provider$_1$", "content provider$_2$" and "content provider$_n$." For this example, the user may then select from the "home network", "content provider$_1$", "content provider$_2$" and "content provider$_n$" directories to locate music. In another embodiment, digital media from all media servers are aggregated, and directories, which arrange the digital media, are presented to the user. For example, digital music may be arranged by the topics of "albums", "artists" and "genres." Digital music files, aggregated from different content sources, may be stored together in the "albums", "artists" and "genres" directories.

In one example scenario, a user may desire to download music to the media device from a computer located on the home network. To accomplish this task, the user selects the directory "home network" from directory information (e.g., icons of folders) displayed in the media device. The user may view on the media device display a plurality of digital media, available on the computer, as files. The user then selects a file (i.e., media item) to open, and in response, the network bridge opens a connection with the computer, and the media item is streamed or copied to the media device. Similarly, the user may select a content provider, such as content provider$_2$ 850, and view and download digital media associated with that content provider.

As shown in FIG. 8, digital media is associated with each content source. The digital media appear as files in the file system to the user. For example, if the user opens the home network 830 directory as a file system operation, then the network bridge returns a list of digital media as files. The user may then open a media item as an open file operation. In response to the open file operation, the network bridge streams the media to the device.

Although the example content directory of FIG. 8 is organized to correspond to a high level system wide content menu, available within the content sources, any arrangement of content directories and digital media that maps a file system to a content directory may be used without deviating of the spirit or scope of the invention.

Figure 9:
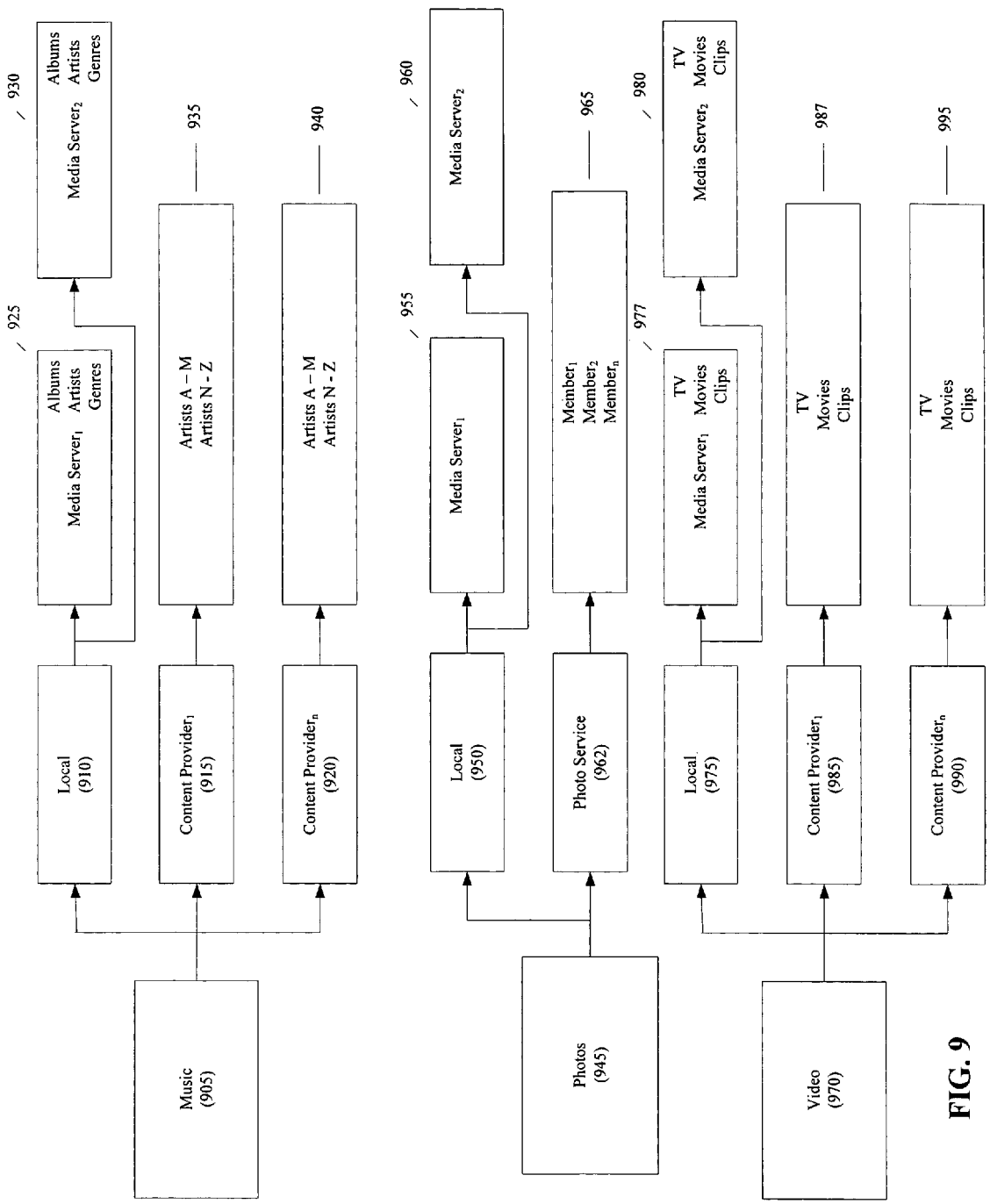
FIG. 9 is a block diagram illustrating one example of a content directory hierarchy.

FIG. 9 is a block diagram illustrating one example of a content directory hierarchy. For this example, the root directory—content directory (810, FIG. 8) comprises three menu items: music 905, photos 945 and video 970. For this example, the content sources are listed under each content menu item type. In one embodiment, the network bridge builds directories based on media available for the associated media type. For the example shown in FIG. 9, three directories are built for the music menu item: a local directory (910), content provider, directory (915) and content provider$_n$ directory (920). Each directory includes one or more subdirectories and/or one or more digital media. For the example shown in FIG. 9, local directory 910 includes subdirectories media servers (925) and media server$_2$ (930). These subdirectories are organized by media servers. In another embodiment, digital media from all media servers are aggregated, and directories for "albums", "artists" and "genres" are presented to the user. Digital music files associated with the "albums", "artists" and "genres" arrangement are organized within these directories.

The music directory 905 further includes "Artists A-M" and "Artists N-Z" (935 and 9 40) subdirectories for each content provider subdirectory (915 and 920). The "Artists A-M" and "Artists N-Z" (935 and 9 40) subdirectories are one way to organize music for the online providers. For this example, a user browses the subdirectories (935 and 940) to locate digital music. The directory hierarchy shown in FIG. 9 is merely exemplary, and digital media may be organized into any number of directories and subdirectories without deviating from the spirit or scope of the invention.

The example of hierarchy of FIG. 9 further includes, under the photos directory 945, subdirectories for local 950 and photo service 962. The local directory 950 provides a top level directory—menu item for photos available on the home network, and the photo service directory 962 provides a top level directory—menu item for photos available over the wide area network. For example, a group of users may post photos on an Internet portal to allow sharing of photos among members of the group. The local directory includes two subdirectories: media server$_1$ 955 and media server$_2$ 960. In turn, each media server directory includes digital photo files stored on that media server. By way of example, the photo service directory 962 may include subdirectories associated with members associated with the user's group for sharing photos over the wide area network.

The video directory 970, similar to the music directory 905, has a local directory 975 and a directory for each content provider (985 and 990). In this example, the content providers organize new content by "TV", "movies" and "video clips." A user may navigate to a subdirectory to download a video in an associated category.

Figure 10A:
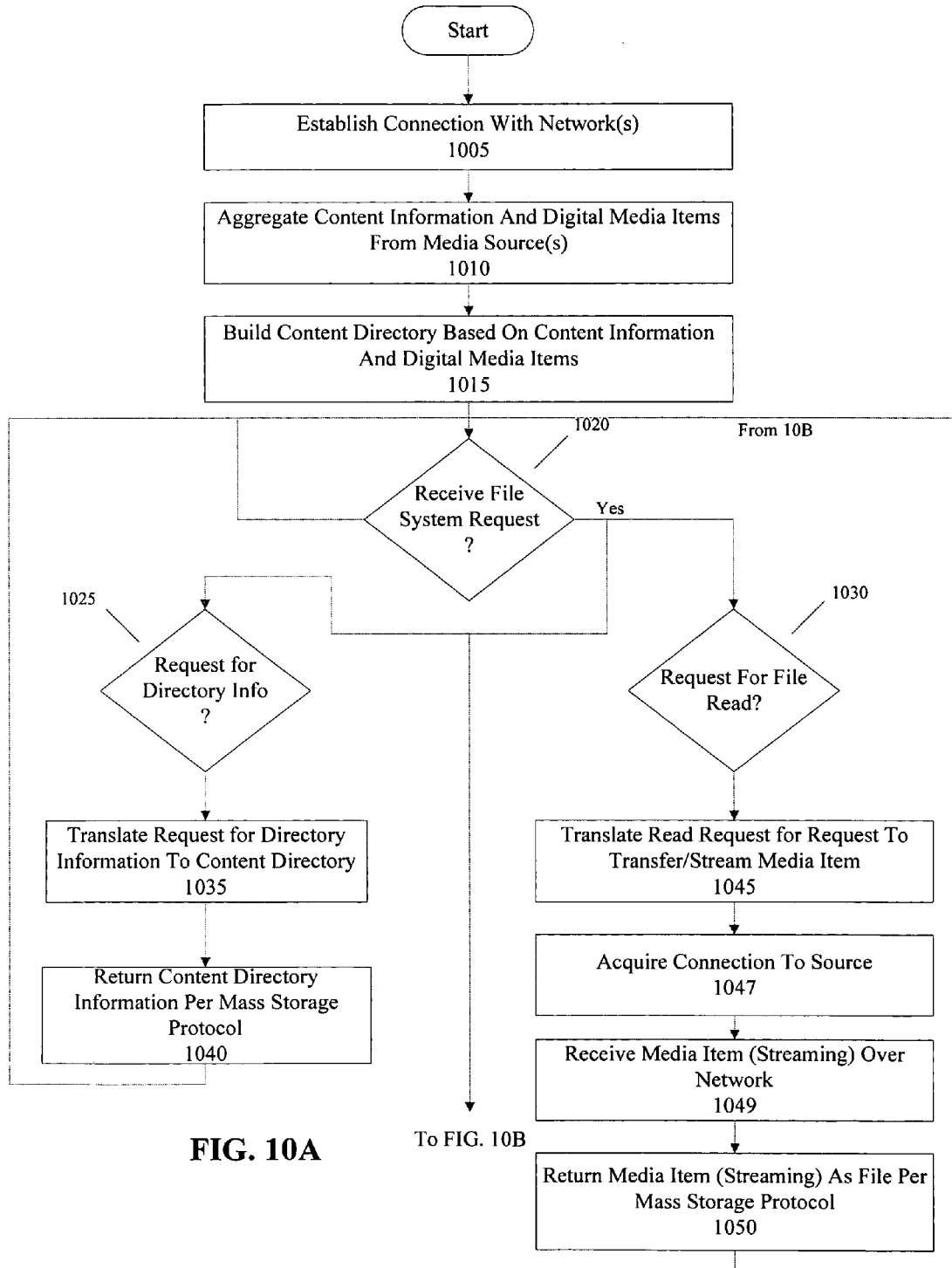
FIGS. 10a and 10b are flowcharts illustrating one embodiment for using a network bridge to transfer media to a media device.
Figure 10B:
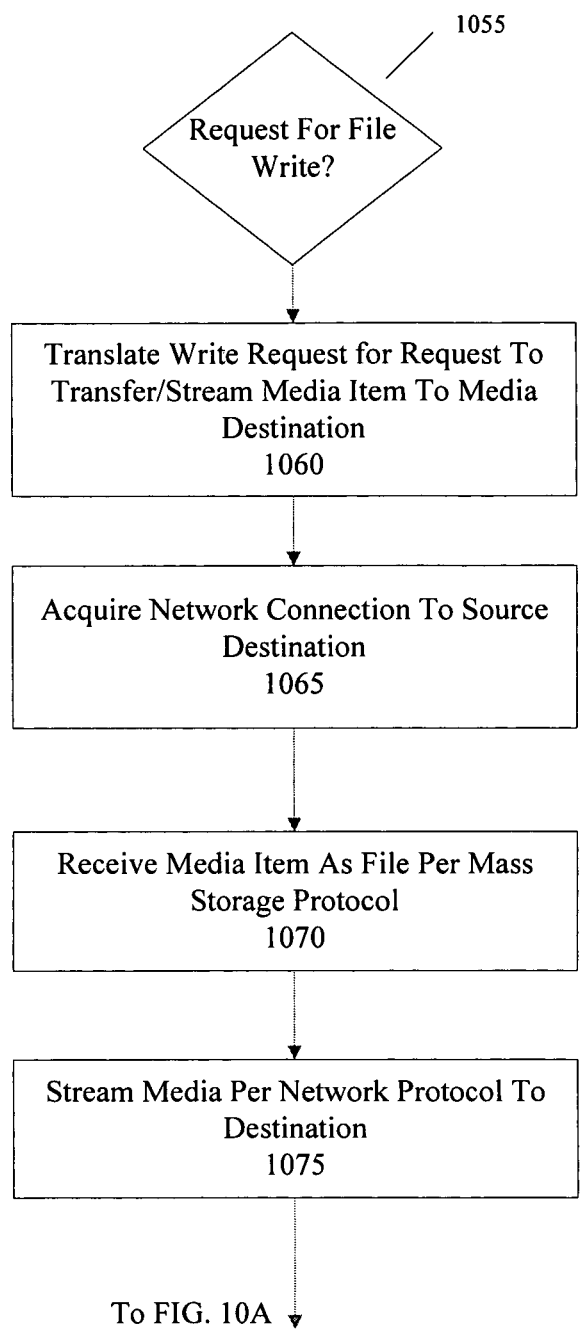

Transfer of Media Using Network Bridge:

FIGS. 10a and 10b are flowcharts illustrating one embodiment for using a network bridge to transfer media to a media device. Initially, a user connects a media device to a network bridge configured in accordance with the present invention. The network bridge establishes connections with one or more networks (FIG. 10a, block 1005). For example, the network bridge may establish a network connection with a local area network, such as a wireless home network. The network bridge may also establish a connection with a wide area network, using TCP/IP protocol, such as the Internet.

After establishing network connections, the network bridge aggregates content information and digital media from available media sources (FIG. 10a, block 1010). In one embodiment, the network bridge acquires content information from the content providers when the network bridge establishes a network connection. The network bridge then builds subdirectories for the content provider based on the information provided. For example, if the network bridge connects with a home network, the network bridge may acquire content information as well as a list of available digital media from a media server, a process known as server aggregation. Content information may include categories for arranging the media. For example, a music portal may arrange available content by "album", "genre", and "artist." In other embodiments, the network bridge may acquire a list of available digital media from every media device on the home network. This process is known as client aggregation of media. The network bridge may also query content providers on the wide area network to determine media available for the user. For example, content providers may offer content only to subscribers. For this embodiment, the network bridge may log-on to the content provider's Internet portal, and provide a list of available media for that subscription. In other embodiments, the network bridge may attach to Internet web sites to permit uploading and downloading of media to those Web sites. Based on available content information and digital media, the network bridge builds a content directory (FIG. 10a, block 1015). For example, the content directory may be a UPnP directory for a home network.

In general, the media device generates file system requests, in accordance with the mass storage protocol, and receives, in response, content information for directory requests and digital media for file requests. The network bridge receives a file system request (FIG. 10a, block 1020). If the media device request is for directory information, then the network bridge translates the request for directory information to a request for content directory information (FIG. 10a, blocks 1025 and 1035). In response to the request, the network bridge formats the content directory information as directory information in accordance with the mass storage protocol (FIG. 10a, block 1040). In another embodiment, the network bridge queries a content provider or home network to acquire content information. For this embodiment, the network bridge builds content directory information on the fly based on media device requests. The media device reads the directory information (i.e., content information), in accordance with the mass storage protocol, and displays the content information at the media device in the form of directory information.

If the file system request is a request to read a file, then the network bridge translates the read file request into a request to transfer a media item associated with that file (FIG. 10a, blocks 1030 and 1045). The read request identifies the file and its associated location in the file system directories. The network bridge, using the necessary network protocols, acquires a connection to the source, and initiates a request for the digital media from over the network (FIG. 10a, blocks 1045 and 1047). In one embodiment, the media item is delivered as streaming media (e.g., audio or video). In other embodiments, the media item may be downloaded and copied to the media device.

However, digital rights management schemes may dictate transfer of digital media by streaming instead of copying. The network bridge receives the media item (copy or stream) per the network protocol (e.g., TCP/IP packets), and delivers the digital media to the media device per the connected protocol (FIG. 10a, block 1050). For example, if the mass storage protocol specifies the transfer of file in "blocks", then the media is returned in blocks as requested by the underlying application reading the media file.

The media device may also execute write operation requests to the network bridge. If the network bridge receives a request to write a file from the media device, the network bridge translates the write file request into a request to upload a media item to a device on the network (FIG. 10b, blocks 1055 and 1060). The write request includes a location, in the file system directory, to write the file. The write request may be executed to copy the media item to a destination location or stream the media item to a destination location for playback. The network bridge translates the directory information in the write request into a network destination location, and acquires a network connection to the destination location (FIG. 10b, block 1065). The network bridge receives the media item as a file per the connected protocol (e.g., USB mass storage) (FIG. 10b, block 1070). Using the network protocol for the network of the destination location, the network bridge transmits, either streaming or copying, the media item to the destination location (FIG. 10b, block 1075).

Figure 11:
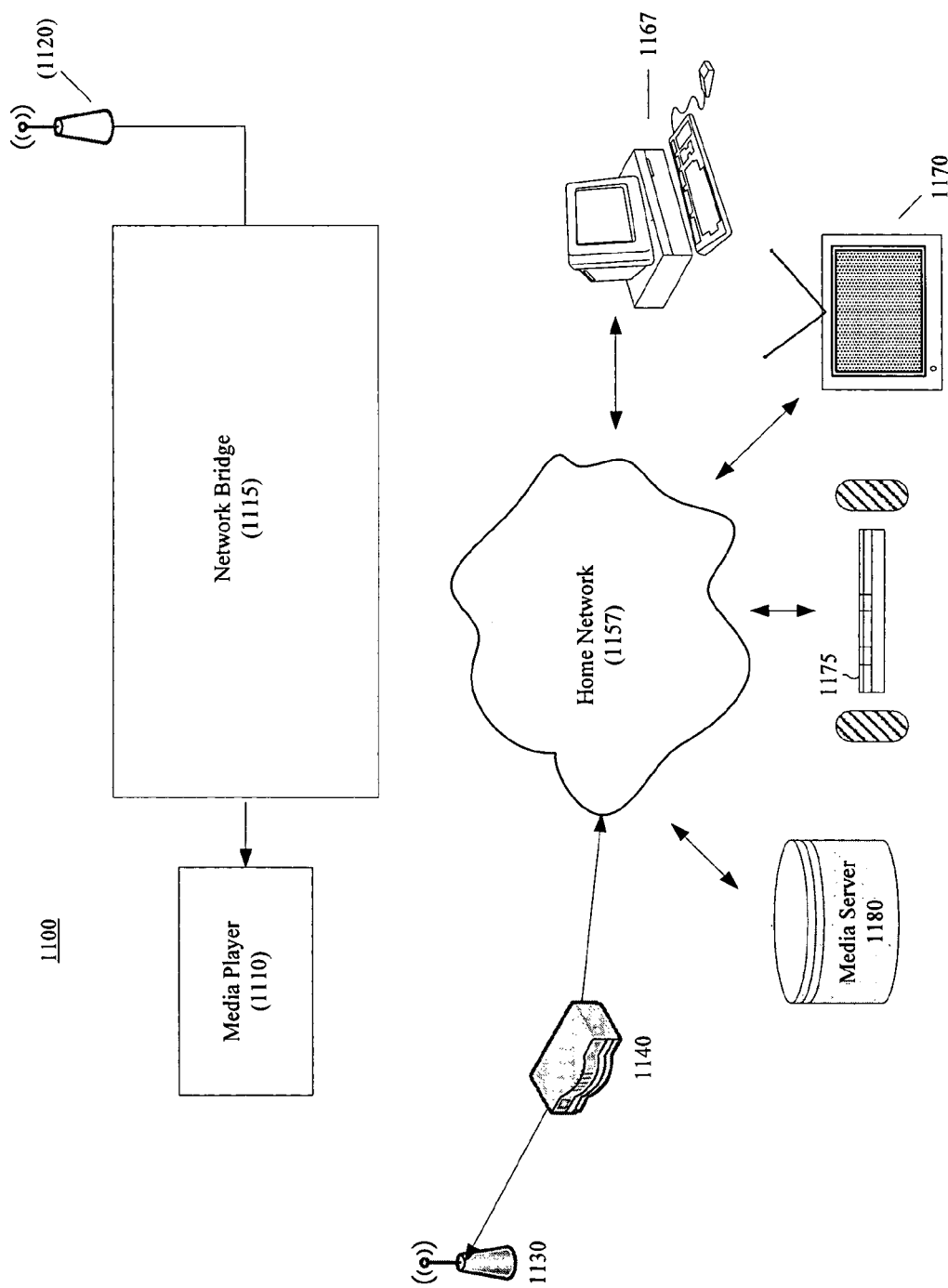
FIG. 11 illustrates one embodiment for downloading digital media over a home network using a network bridge.

Network Applications:

FIG. 11 illustrates one embodiment for downloading digital media over a home network using a network bridge. For this embodiment, a media player (e.g., audio or video player) is coupled to network bridge 1115. The network bridge communicates with home network 1157 through wireless access point 1130 and router 1140. As shown in FIG. 11, various media devices are accessible on home network 1157. For this example, computer 1157, media server 1180, stereo 1175 and television 1170 are all on home network 1157. The network bridge 1115 downloads digital media from any device on home network 1157. For example, media player 1110 may download a digital video file from computer 1167. Similarly, media player 1110 may download a digital audio file from media server 1180.

Figure 12:
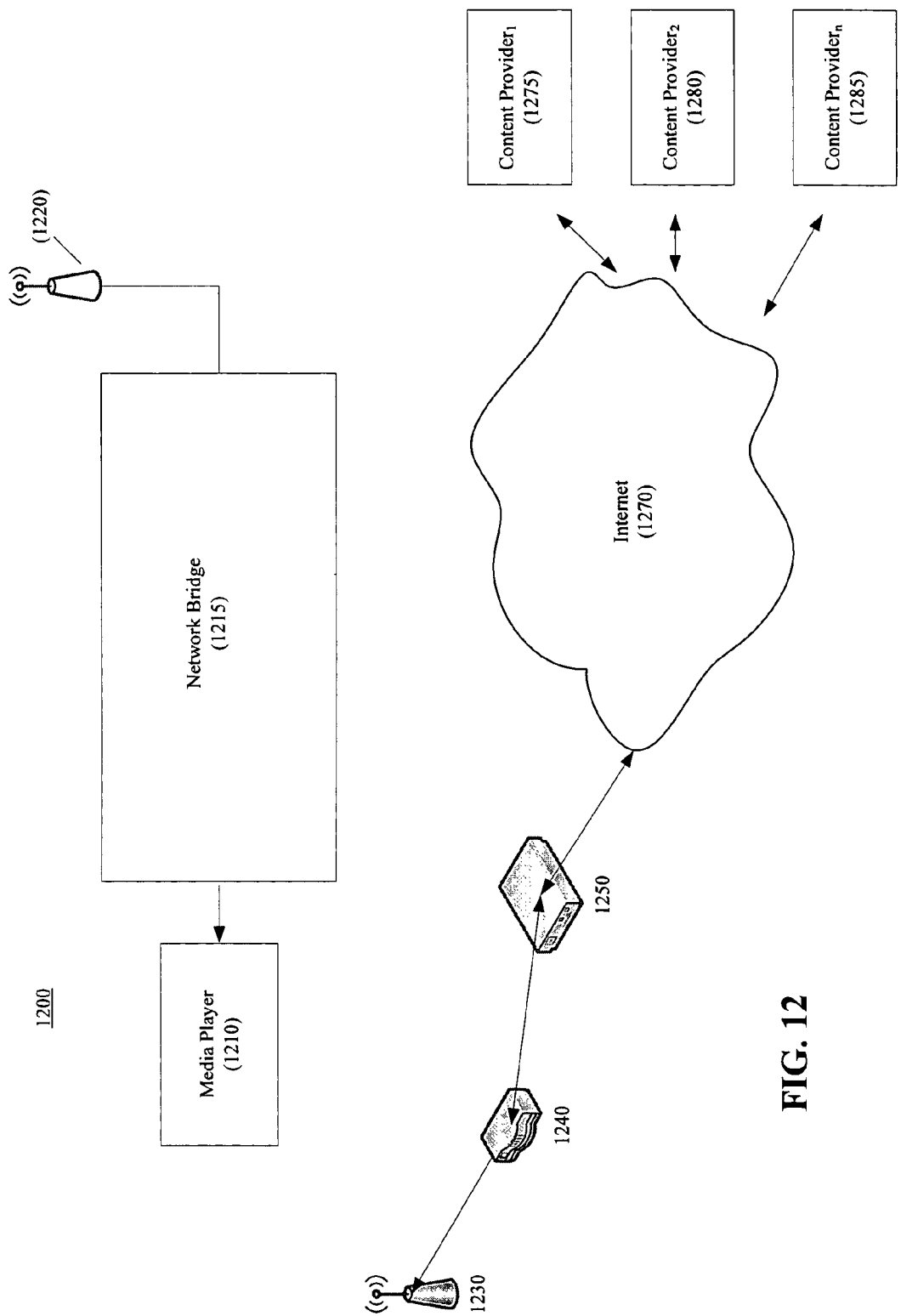
FIG. 12 illustrates one embodiment for downloading content over the Internet to a portable media player using a network bridge.

The network bridge of the present invention has applications to download content over a wide area network from content providers. FIG. 12 illustrates one embodiment for downloading content over the Internet to a portable media player using a network bridge. For this embodiment, media player 1210 is coupled to network bridge 1215. In turn, network bridge 1210 connects to the Internet 1270 via a wireless access point 1230, router 1240 and wideband modem 1250. For this example, network bridge 1215 obtains network connections to three content providers (1275, 1280 and 1285). The content providers (1275, 1280 and 1285) may be Internet portals to media stored on servers in remote locations. The content may be available on a subscription basis. In other embodiments, a content provider may comprise an Internet store that permits sale of digital music and video. And yet other embodiments, the content provider may comprise an Internet community for downloading photos with other members of the shared community. Media player 1210, through network bridge 1215, has access to download digital music, video and photos from the content providers (1275, 1280 and 1285).

Figure 13:
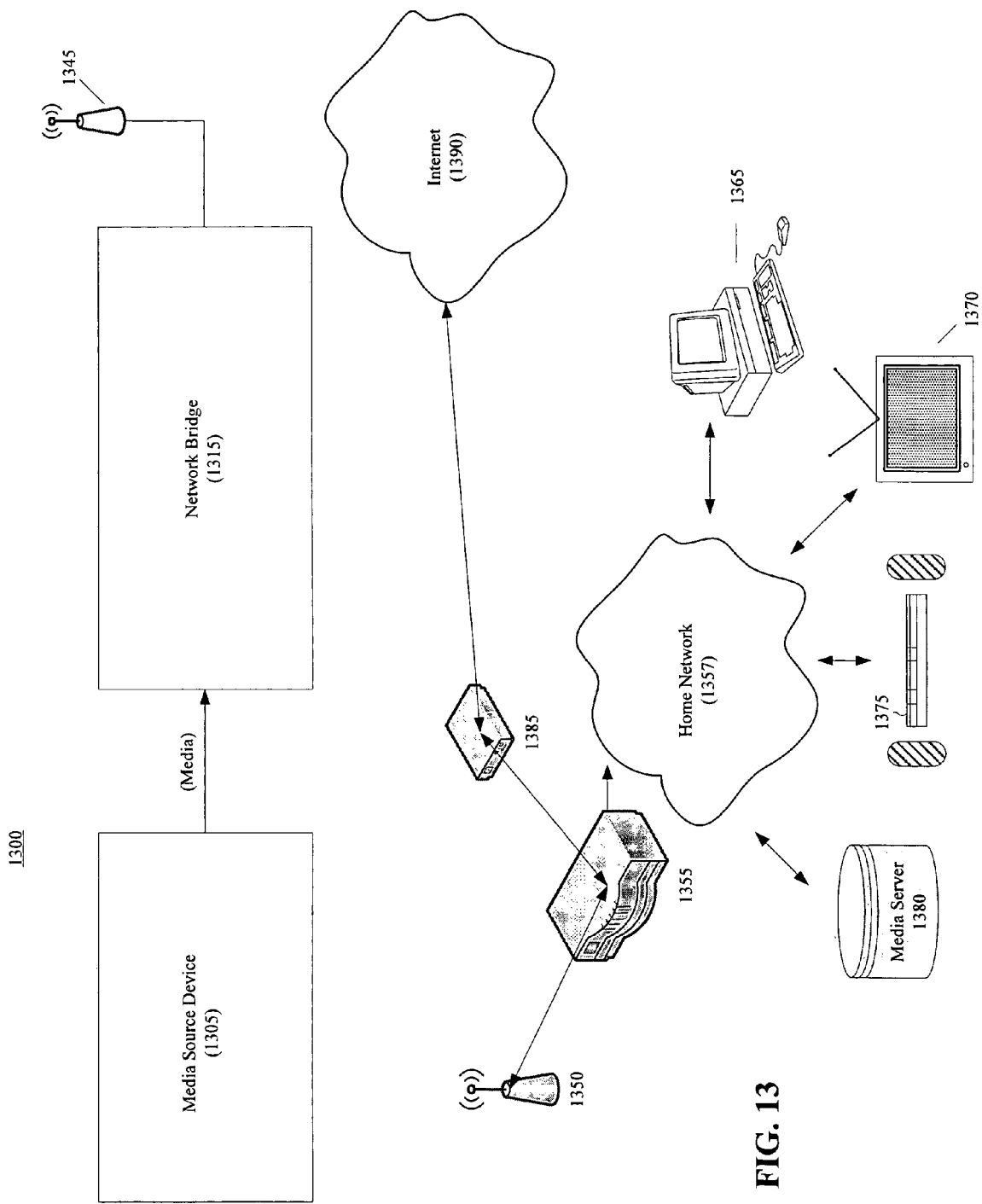
FIG. 13 illustrates one embodiment for uploading media using the network bridge.

The network bridge of the present invention has application for uploading media across a network. FIG. 13 illustrates one embodiment for uploading media using the network bridge. For this embodiment, a media source device 1305 is coupled to a network bridge (1315). The network bridge accesses both a home network 1357 and Internet 1390. Specifically, network bridge accesses home network 1357 through wireless access point 1350 and router 1355. The network bridge accesses the Internet 1390 also through wireless access point 1350, router 1355 and broadband modem 1385. The media source device 1305 may store digital video, audio and/or photos. For example, media source device 1305 may be a portable media player that contains a hard disk drive or flash memory for storing files in a permanent medium. The media is uploaded to the network bridge 1315, which in turn, uploads the digital media to a destination location on either home network 1357 or Internet 1390. For example, media source device 1305 may upload media for storage on computer 1365 or media server 1380. In other embodiments, media source device 1305 may stream media to the destination location. For example, media source device 1305 may stream audio for playback on stereo 1375, or it may stream digital video for playback on television 1370.

Figure 14:
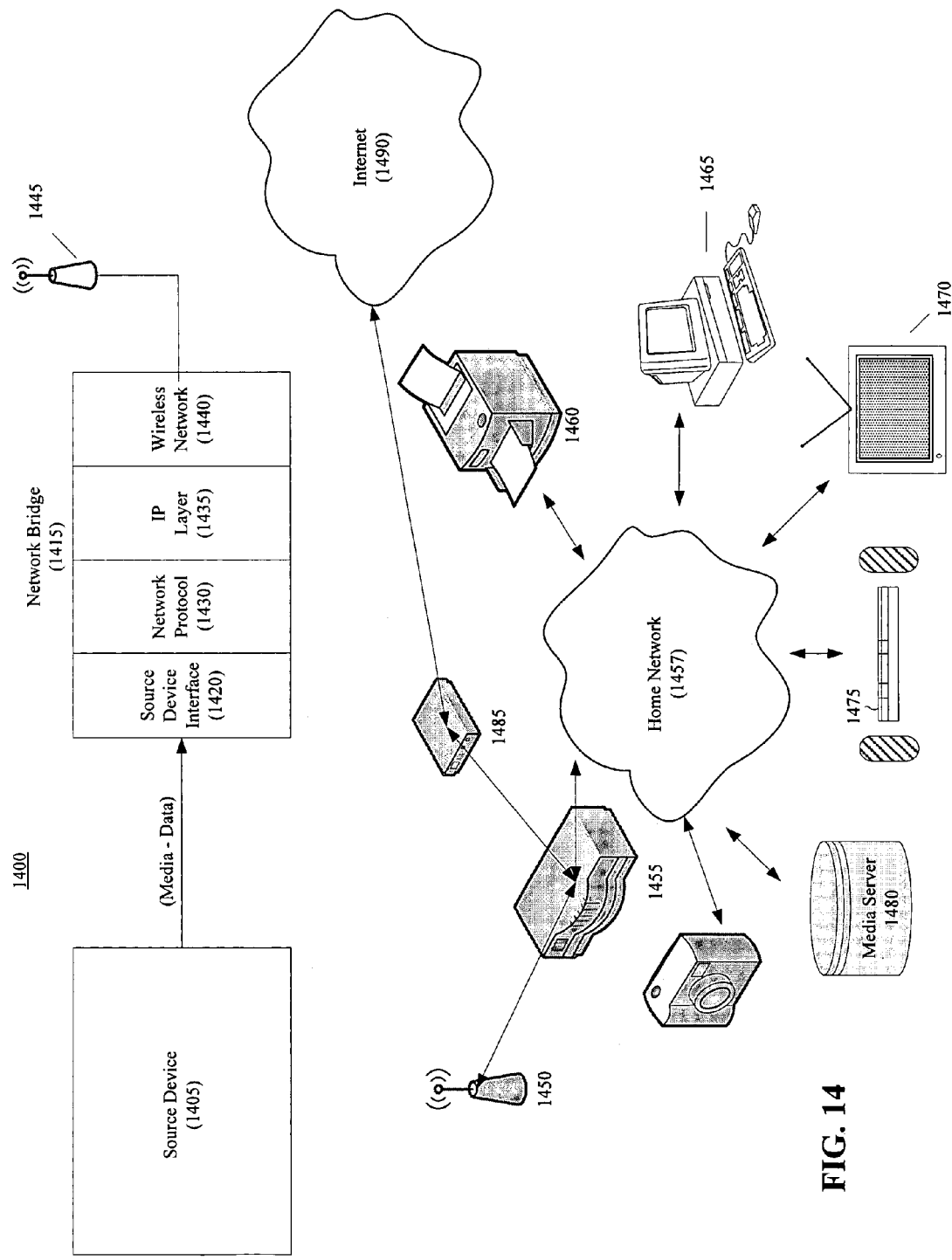
FIG. 14 illustrates one embodiment for writing data to a destination device using a network bridge.

The network bridge of the present invention also has application to transfer data to support protocols other than a mass storage protocol. FIG. 14 illustrates one embodiment for writing data to a destination device using a network bridge. The network bridge has connectivity to home network 1457 through access point 1450 and router 1455, as well as connectivity to Internet 1490 through access point 1450, router 1455 and broadband modem 1485. Source device 1405 writes data or media to network bridge 1415, which in turn, writes media and data to one or more destination devices accessible on home network 1457 or Internet 1490.

For this embodiment, network bridge 1415 includes a source device interface 1420, network protocol 1430, IP layer 1435 and wireless network interface 1440. Source device interface 1420 provides a physical layer connection to the source device 1405. For example, the physical layer connection may comprise a universal serial bus ("USB") connection. The network protocol module 1430 supports the underlying protocol used to transfer the data. In one embodiment, network protocol module 1430 supports the MTP protocol, a Microsoft media player standard. In other embodiments, the network protocol module 1430 may support the PTP standard, which permits controlling a camera, implemented in digital camera manufacturers. The network protocol module 1430 may support any protocol. Using a protocol, source device 1405 may transfer media or data to any destination device on the home network 1457 or Internet 1490.

Figure 15:
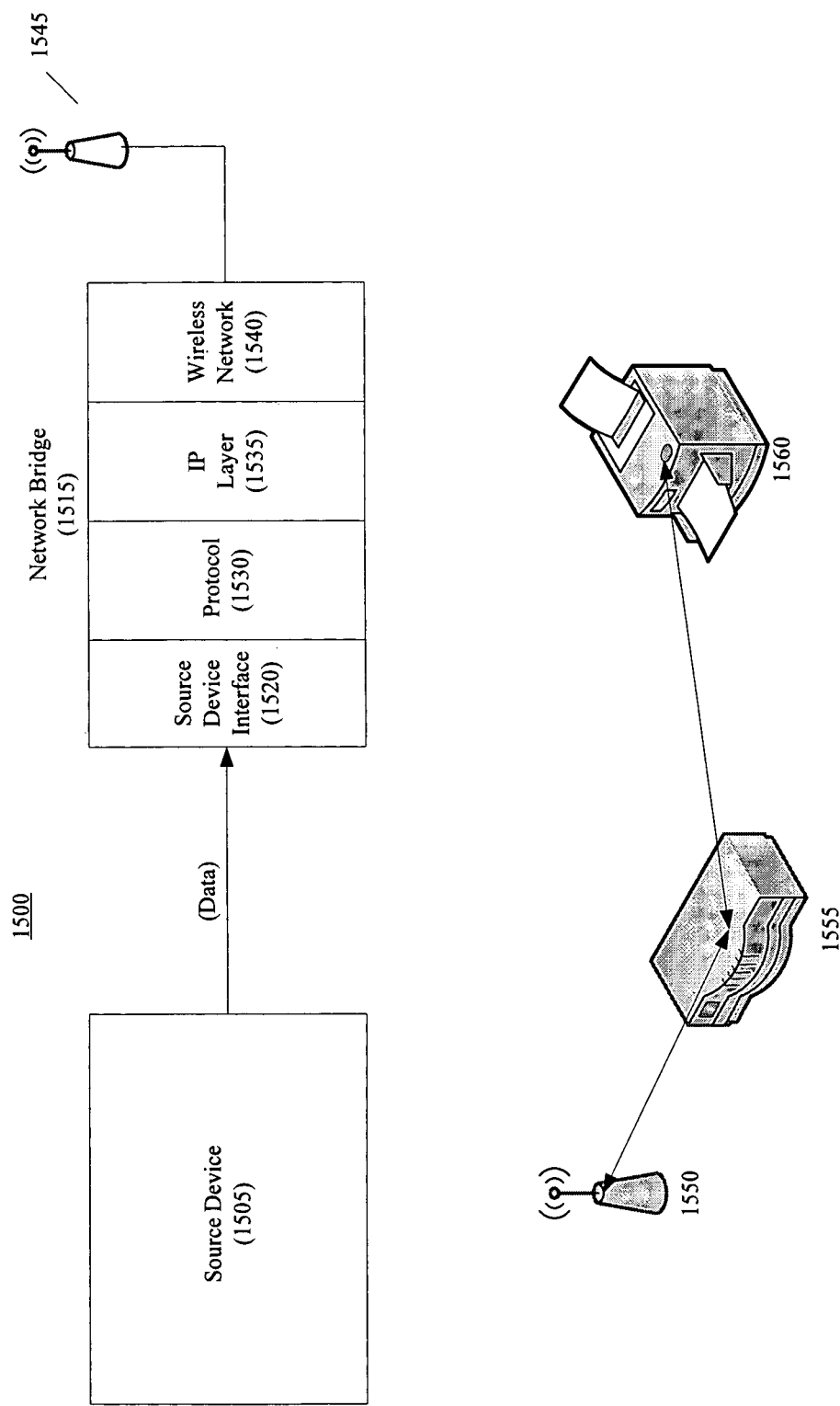
FIG. 15 illustrates one embodiment for printing using the network bridge of the present invention.

FIG. 15 illustrates one embodiment for printing using the network bridge of the present invention. For this embodiment, source device 1505 writes data to network bridge 1515 in accordance with a format compatible with the source device interface 1520. In turn, protocol interface 1530 emulates a protocol for printing data. For this example, data is received over a wireless network to printer 1560. Thus, by emulating the printing protocol, network bridge 1515 provides connectivity to provide printing services to the device.

Figure 16:
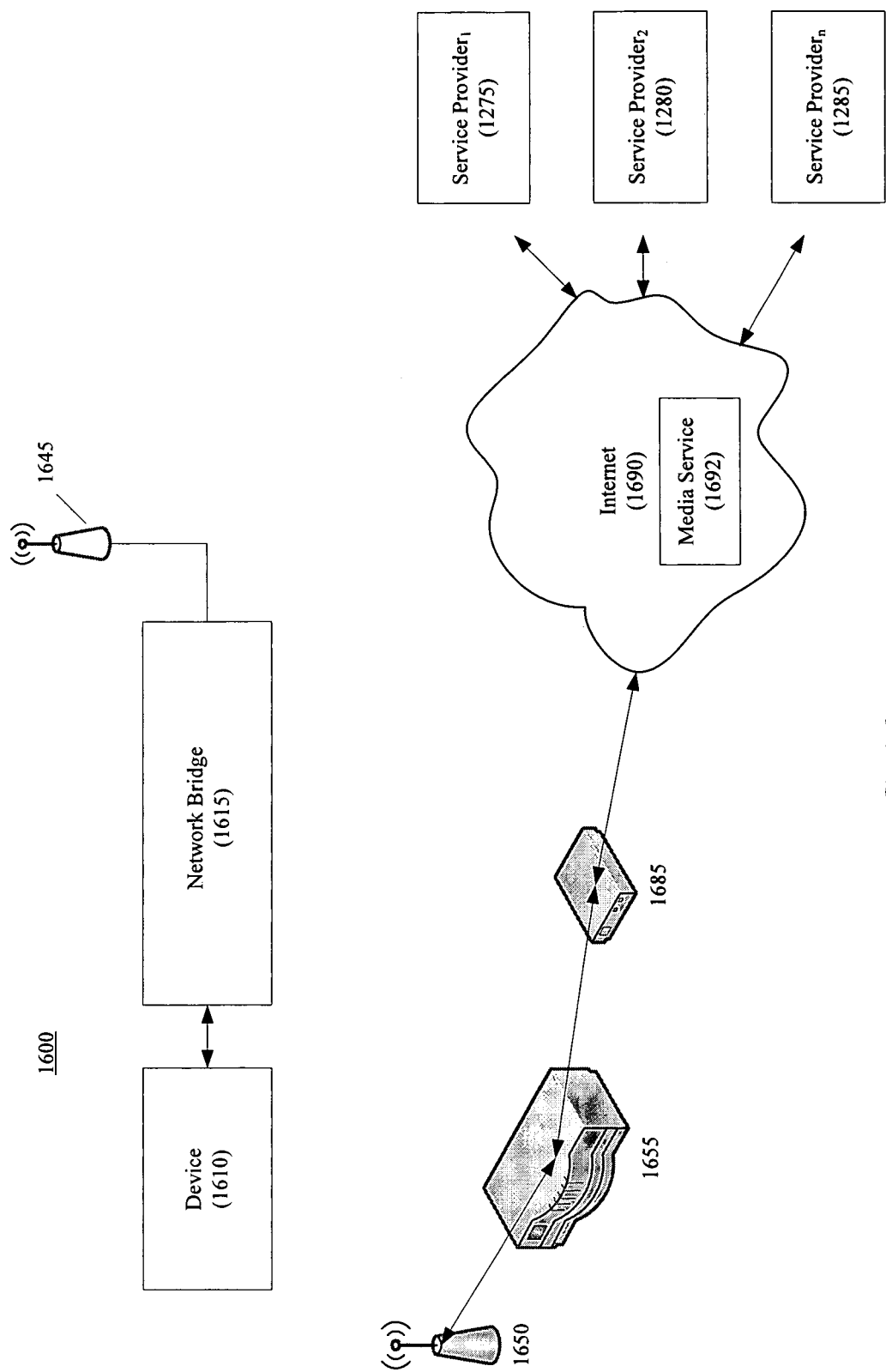
FIG. 16 illustrates one embodiment for a network bridge configured to operate with a media service.

Media Services:

In some embodiment, the network bridge may operate in conjunction with media services. FIG. 16 illustrates one embodiment for a network bridge configured to operate with a media service. As shown in FIG. 16, network bridge 1615 connects to Internet 1690, via wireless access points 1645 and 1650, router 1655 and broadband modem 1685. In general, media services 1692 provides access for the network bridge to media content from content providers content provider₁ (1275), content provider₂ (1280) and content providerₙ (1285).

In operation, network bridge 1615 initiates a connection with media services 1692, and uniquely identifies itself. In one embodiment, the network bridge is packaged for sale with a unique number. A purchaser of the network bridge uses the unique number to set-up an account with the media service. The account may specify terms of a user's purchase of media content from one or more content providers. For example, the user may purchase a subscription to purchase one or more types of media from one or more content providers. The network bridge may be pre-programmed with an IP address to access the media service over the Internet. When the network bridge accesses the media service, the media service identifies the account, and provides access to content based on the content purchased with the account.

In response, media services 1692 may automatically determine media available to the network bridge 1615 and a location of the available media (e.g., content provider₁ (1275), content provider₂ (1280) and content providerₙ (1285)). As such, media services 1692 acts as a broker between content providers and users, via the network bridge. In some embodiments, media services provide a connection between the network bridge 1615 and content provider₁ (1275), content provider₂ (1280) and content providerₙ (1285). For these embodiments, media services 1692 acquires the digital media from the content providers, and transfers the digital media to the network bridge. Media services 1692 may provide customized views of content provided by content providers. For example, media services 1692 may generate content directories to present the media in a manner suitable for the user. The content directories may be customized by users. For example, a user may specify directories to organize the content.

In one embodiment, media services 1692 may store "group information." In general, group information identifies media available to the network bridge. In one embodiment, the group information links a network bridge to a user. The user may be associated with one or more groups. For example, a user may create a ski group to link individuals interested in skiing. The users in a group specify content available to members in that group. For example, a member of the ski group may specify a content directory—subdirectory that stores all content available to members of the ski group (e.g., content related to skiing).

The functionality for the network bridge described herein may be implemented in either hardware or software. For the software implementation, the network bridge contains software that includes a plurality of computer executable instructions for implementation on a general-purpose computer system. Prior to loading into a general-purpose computer system, the network bridge software may reside as encoded information on a computer readable medium, such as a magnetic floppy disk, magnetic tape, and compact disc read only memory (CD-ROM).

Although the present invention has been described in terms of specific exemplary embodiments, it will be appreciated that various modifications and alterations might be made by those skilled in the art without departing from the spirit and scope of the invention.

What is claimed is:

1. A media system comprising:
   a portable network bridge, comprising a mass storage protocol module that performs a mass storage protocol utilizing a mass storage file system to associate media items with storage locations, the mass storage protocol for storing files in a file system format of the mass storage file system of the portable network bridge, the portable network bridge configured to receive from a content provider over a wide area network and upload to the content provider over the wide area network at least one media item, the portable network bridge arranged:
   for receiving, from a host device, a first user request in accordance with said mass storage protocol, said first user request being a request to read or write at least one media item,
   for translating, in response to receiving said first user request, said first user request to a second protocol request to receive from said content provider or upload to said content provider the at least one media item, by way of said wide area network, depending on whether said first user request is a request to read or write, respectively, said second protocol request identifying at least one storage location of the at least one media item in at least one directory of the mass storage file system,
   for transferring said second protocol request to said content provider over said wide area network,
   for receiving, based on data in the second protocol request that was translated from the first user request, data corresponding to the at least one media item from said content provider over said wide area network,
   for translating said data corresponding to the at least one media item into data compatible with a predetermined protocol, wherein the predetermined protocol corresponds to a device on a local area network, and
   for transferring said data compatible with said predetermined protocol to said local area network.

2. The media system as set forth in claim 1, wherein:
   said second protocol request comprises a request to transfer media from a content provider to said portable network bridge;
   said content provider for receiving said second protocol request and for transferring a media item to said portable network bridge; and
   said portable network bridge for transferring said media item to said host device.

3. The media system as set forth in claim 2, wherein said portable network bridge is further arranged for transferring said media item to said host device by presenting said media item in a file system.

4. The media system as set forth in claim 1, wherein said portable network bridge also is-arranged for receiving, from said host device a further request which comprises a request to view at least a partial list of media items available from said content provider.

5. The media system as set forth in claim 1, wherein presenting said content directory to said host device comprises presenting said content directory as directory information in a file system.

6. The media system as set forth in claim 1, wherein said media item comprises video.

7. The media system as set forth in claim 1, wherein said media item comprises audio.

8. The media system as set forth in claim 1, wherein said media item comprises a digital photo.

9. The media system as set forth in claim 1, wherein the portable network bridge is further arranged for identifying at least one service provider available on said wide area network.

10. The media system as set forth in claim 1, wherein said content directory comprises a content directory of media available from a plurality of content providers.

11. The media system as set forth in claim 1, wherein said content directory comprises a view of a content directory customized by or for a user and comprising media available from one or more content providers.

12. The media system as set forth in claim 1, wherein presenting said content directory to said host device comprises presenting said content directory as directory information in a file system.

13. The media system as set forth in claim 1, wherein said portable network bridge is further arranged:
for generating a content directory based on digital media available over the wide area network, the generating comprising:
identifying digital media;
identifying the location of the digital media;
generating a content directory that organizes said digital media available over said wide area network, the content directory comprising a content root directory and plural content sub-directories, the digital media being organized in the plural content sub-directories; and
presenting said content directory to said host device in accordance with the file system format of the mass storage file system of said network bridge,
wherein the mass storage file system comprises a mass storage root directory and plural mass storage sub-directories, the content root directory is mapped to the mass storage root directory, and each content sub-directory is mapped to a corresponding mass storage sub-directory,
wherein the content root directory is associated with a content menu that comprises a user interface menu for selecting digital media organized in the content directory, each menu item of the user interface menu being presented to said host device as a mass storage sub-directory, and
wherein the mappings between the plural mass storage sub-directories and the plural content sub-directories are used to translate said file system request to a request for a transfer of at least one digital media item.

14. A media system comprising:
a portable network bridge, comprising a mass storage protocol module that performs a mass storage protocol utilizing a mass storage file system to associate media items with storage locations, the mass storage protocol for storing files in a file system format of the mass storage file system of the portable network bridge, the portable network bridge configured to receive from a content provider over a wide area network and upload to the content provider over the wide area network at least one media item, the portable network bridge arranged:
for receiving, from a host device, a first user request in accordance with said mass storage protocol, said first user request being a request to read or write at least one media item,
for translating, in response to receiving said first user request, said first user request to a second protocol request to receive from said wide area network or upload to said wide area network the at least one media item, depending on whether said first user request is a request to read or write, respectively, said second protocol request identifying at least one storage location of the at least one media item in at least one directory of the mass storage file system,
for transferring said second request to said wide area network,
for receiving, based on data in the second protocol request that was translated from the first user request, data corresponding to the at least one media item from said content provider over said wide area network,
for translating said data corresponding to the at least one media item into data compatible with a predetermined protocol, wherein the predetermined protocol corresponds to a device on a local area network, and
for transferring said data compatible with said predetermined protocol to said local area network; and
a media service, coupled to said wide area network, for receiving said second protocol request and for providing a response to said second protocol request to said portable network bridge for media items from said content provider.

15. The media system as set forth in claim 14, wherein said portable network bridge is further arranged for receiving, from said host device, a further request which comprises a request to view at least a partial list of media items available from said media service.

16. The media system as set forth in claim 14, wherein:
said second request comprises a request to transfer media from said content provider to said portable network bridge;
said media service for receiving said second request and for establishing a connection between said content provider and said portable network bridge;
said content provider for transferring a media item to said portable network bridge; and
said portable network bridge for transferring said media item to said host device.

17. The media system as set forth in claim 16, wherein said portable network bridge is further arranged for transferring said media item to said host device by presenting said media item in a file system.

18. The media system as set forth in claim 14, wherein said media service further stores group information, wherein said group information identifies at least two portable network bridges.

19. The media system as set forth in claim 14, wherein said media service further associates an account with a portable network bridge to provide at least one media item from at least one content provider.

20. The media system as set forth in claim 14, wherein at least one content provider comprises a plurality of content providers.

21. A media system comprising:
a portable network bridge, comprising a mass storage protocol module that performs a mass storage protocol utilizing a mass storage file system to associate media items with storage locations, the mass storage protocol for storing files in a file system format of the mass storage file system of the portable network bridge, the portable network bridge configured to receive from a content provider over a wide area network at least one media item, the portable network bridge arranged:

for receiving, from a host device, a first user request in accordance with said mass storage protocol, said first user request being a request to read or write at least one media item, for translating, in response to receiving said first user request, said first user request to a second protocol request to receive from said content provider the at least one media item, by way of said wide area network, said second protocol request identifying at least one storage location of the at least one media item in at least one directory of the mass storage file system, for transferring said second protocol request to said content provider over said wide area network, for receiving, based on data in the second protocol request that was translated from the first user request, data corresponding to the at least one media item from said content provider over said wide area network, for translating said data corresponding to the at least one media item into data compatible with a predetermined protocol, wherein the predetermined protocol corresponds to a device on a local area network, and for transferring said data compatible with said predetermined protocol to said local area network.

* * * * *